O. M. WOLFF.
LOW TEMPERATURE COOKING APPARATUS.
APPLICATION FILED JAN. 15, 1919.

1,332,016.

Patented Feb. 24, 1920.
2 SHEETS—SHEET 1.

Witness

Inventor
O. M. Wolff
Eugene C. Brown
Attorney

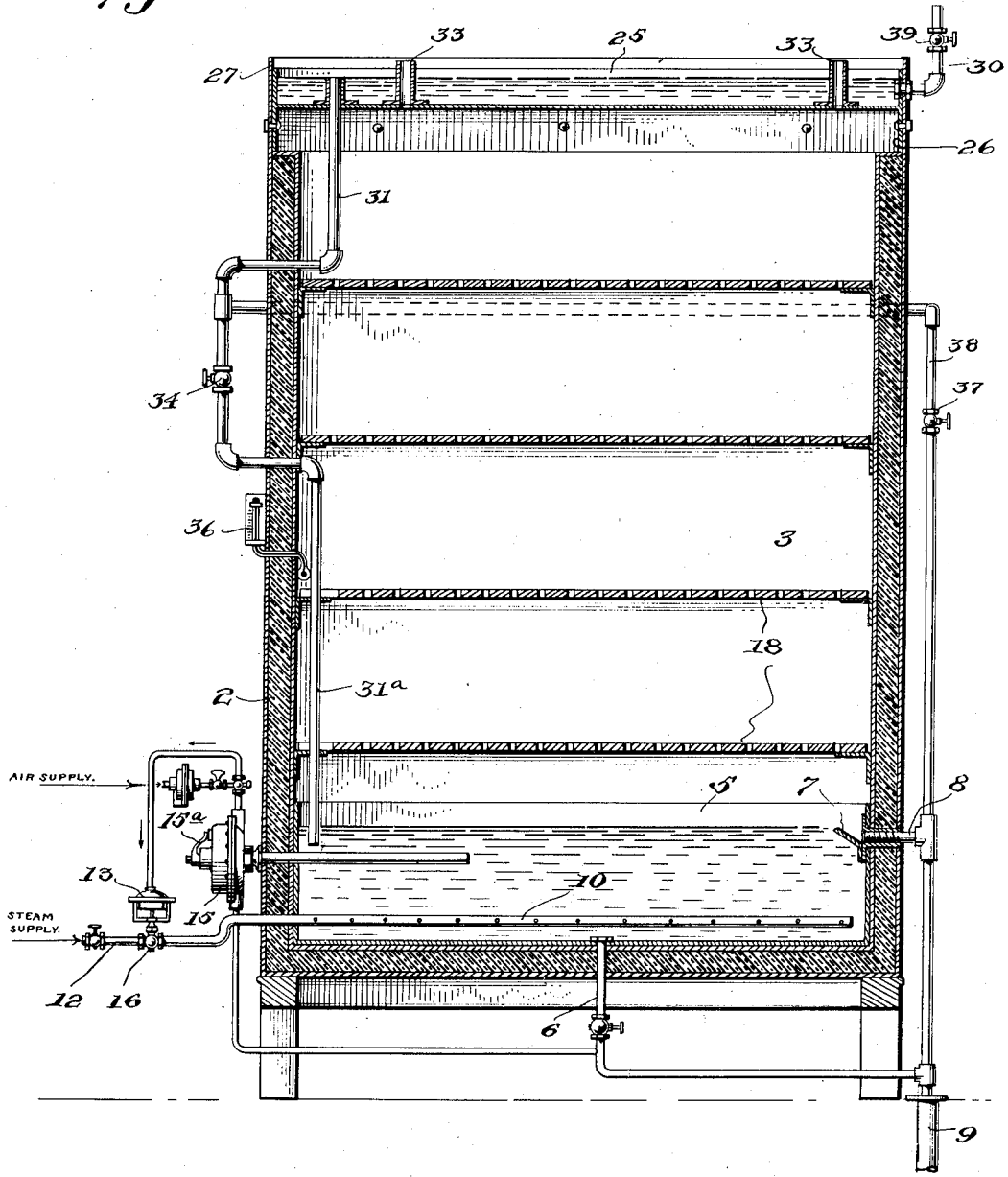

UNITED STATES PATENT OFFICE.

OSCAR M. WOLFF, OF CHICAGO, ILLINOIS.

LOW-TEMPERATURE COOKING APPARATUS.

1,332,016.     Specification of Letters Patent.     Patented Feb. 24, 1920.

Application filed January 15, 1919. Serial No. 271,228.

*To all whom it may concern:*

Be it known that I, OSCAR M. WOLFF, a citizen of the United States, residing at Chicago, in the county of Cook and State of Illinois, have invented certain new and useful Improvements in Low-Temperature Cooking Apparatus, of which the following is a specification.

My invention relates to apparatus intended mainly for cooking meats and employing steam as the primary source of heat, but modifying the temperature and supplying moisture to the atmosphere by introducing the steam into a tank of water located in the lower part of the apparatus.

The main purpose of my present improvements is to increase the condensation and moisture in the atmosphere within the apparatus, thereby preventing the drying and resultant shrinkage of the meat undergoing the cooking operation, which results in a more uniform product, the meat being thoroughly cooked without being overdone in the outer portion, while all of the juices and flavor are retained.

The bottom and side walls of the cooking apparatus are insulated to retain the heat. It has heretofore been proposed to construct the top of thin sheet-metal to provide a radiating surface which will serve to condense a portion of the moisture-laden atmosphere and also cause a circulation within the apparatus. Such construction, however, is ineffectual for this purpose and moreover, is not uniform in action, since it varies with changes in outside atmospheric conditions and its efficiency also varies with its location and with the surroundings.

Figure 1:
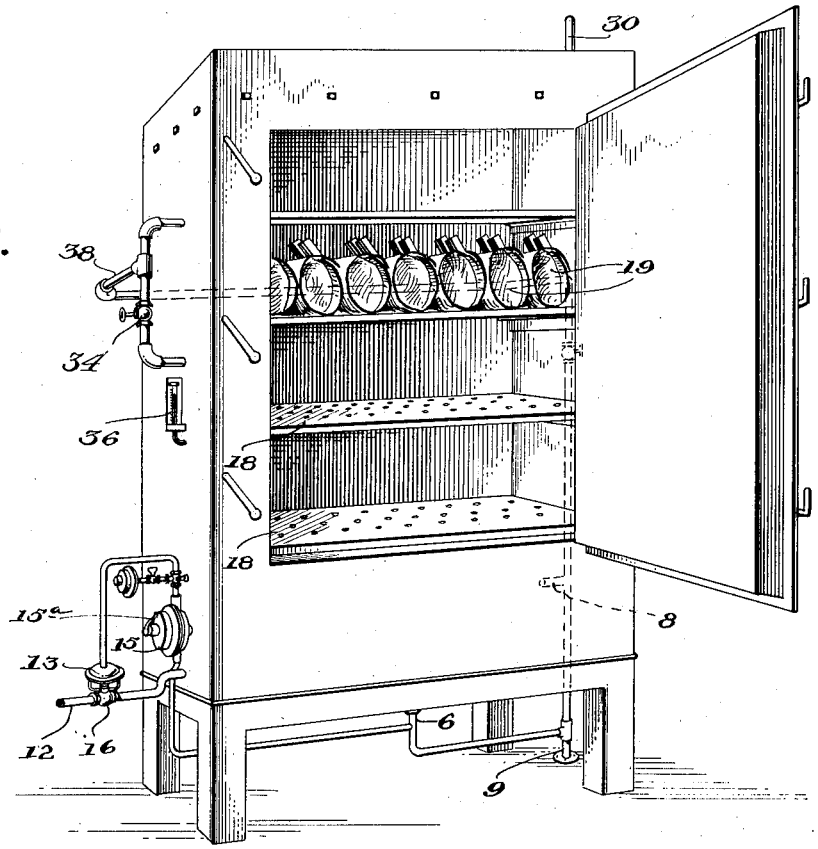
Figure 3:
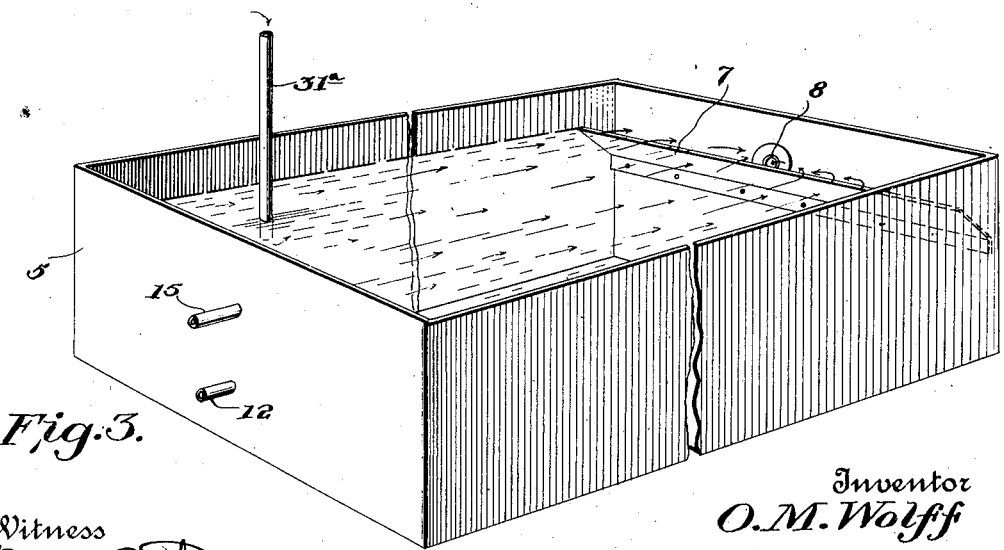

My present invention overcomes the defects existing in prior devices and provides an efficient moisture condensing means which is not dependent upon radiation and which is under direct control. These improvements will be understood and their advantages will be appreciated from the following description in connection with the accompanying drawings, in which—Figure 1 is a perspective view of an apparatus embodying my invention; Fig. 2 is a vertical sectional view of the same; and Fig. 3 is an enlarged perspective view of the steam heated water tank.

The side and bottom of the cooking apparatus are constructed of double sheet metal walls inclosing a filling 2 of heat insulating material. The door is likewise heat insulated and closes steam tight. A water basin or tank 5 is located in the bottom of the cooking chamber 3 and is provided with a drain pipe 6, and along one end with a gutter 7, connected by the outlet pipe 8 with the sewer or drain 9, and serving as an overflow and to continually carry off the grease which collects in the tank, and rises to the surface. By this means the grease is constantly skimmed from the surface of the water and is thus prevented from interfering with the heat radiation and with the evaporation of moisture.

Live steam for heating the water is introduced through a perforated pipe 10 extending through the tank adjacent the bottom and connected to a steam supply pipe 12. The temperature of the water in the tank, which determines the temperature of the atmosphere within the cooking chamber, is controlled automatically by turning on or off the steam supply by means of a thermostat device 15 which extends into the tank and regulates the position of the valve 16. Any suitable form of thermostatically controlled valve may be employed. I have shown one in which the valve is actuated by pneumatic pressure derived from an air supply and acting upon a diaphragm connected to the valve stem. The thermostat acts to open or close a by-pass in the air supply leading to the valve, this device being a well-known article.

The cooking chamber is divided by a number of perforated shelves 18 upon which the hams 19 or other articles to be cooked are placed.

For the purpose of augmenting the condensation and precipitation of the moisture at the upper part of the chamber, I mount a cooling tank 25 at the top and fasten it in any suitable manner as by means of a depending flange 26, riveted to an upward extension 27 of the outer metal sheath. The tank is filled with water which absorbs the heat continually conducted through its metal bottom, a continuous stream of cold water entering through the pipe 30 at one side adjacent the bottom so that it will flow in contact with the bottom of the tank to increase the condensing effect, and flowing out at the other side through the outlet pipe 31. The water-cooled tank continually absorbs the heat which is conveyed away by the outflowing water, the tank thus constituting a condenser top for the cooking chamber. Vents 33 prevent an accumulation of pressure in the chamber.

A portion of the outlet pipe extends along the outside of the cooker, and is provided with a valve 34, the lower end of the pipe 31ª emptying into the tank 5 in the bottom of the apparatus. The water flowing into the lower tank maintains a circulation and causes a constant outflow into the trough 7, resulting in a constant skimming of the grease which drips down from the meat and floats on the surface. If this grease were allowed to accumulate, it would interfere with the evaporation of moisture and hence with the formation of the moisture saturated atmosphere which is essential to the attainment of the highest efficiency in the cooking operation. This automatic skimming of the grease into the trough and conveying it away through the pipe 8 is an important feature. If at any time the thermometer 36 indicates that the water flowing into the tank 5 is causing a reduction of temperature, the amount flowing through the pipe 31 may be decreased or entirely cut off by adjusting the valve 34, and opening the valve 37 which permits the water to by-pass around the oven chamber through the pipe 38.

The several working parts of the apparatus may be accurately controlled and regulated. The supply of cold water may be regulated by means of valve 39. The depth of the water in the condenser tank 25 may be varied to suit different conditions by varying the height of the overflow pipe. The volume of water which flows into the lower steam heated tank 5 may be regulated by means of the valves 34 and 37. The temperature at which the thermostat 15 will cause the actuation of the valve 13 to cut off the steam supply may be regulated in the usual manner by adjusting the position of the thermostat arm 15ª. I have therefore provided not only for the automatic control of the temperature in the oven to the desired predetermined degree, but also for the control of the condensation and the precipitation of the moisture in the upper part of the oven chamber, this feature being entirely new in this art in so far as I am aware and an important improvement. It is evident that I may still further chill the water in the condenser tank 25, by conducting a pipe therethrough conveying brine from the usual refrigerating plant connected with meat packing establishments.

I have described in detail the specific construction illustrated for the purpose of clearly disclosing an embodiment of my invention, but it will be evident to engineers that changes and modifications can be made therein without departing from the invention.

I claim:—

1. A low-temperature cooking apparatus, comprising a cooking chamber having heat insulated bottom and side walls, a vapor condensing top provided with means for maintaining a body of water circulating in contact therewith, a water supply connected thereto, and an outlet therefor.

2. A low temperature cooking apparatus, comprising a cooking chamber or oven having heat insulated bottom and side walls, a valved steam supply pipe leading into the lower part of the chamber, a thermostat extending into said chamber and connected with the valve in said pipe to regulate the supply of steam therethrough, and a vapor condensing chamber-top provided with means for maintaining a circulation of water thereover.

3. A low temperature cooking apparatus, comprising a cooking chamber or oven having heat insulated bottom and side walls, a tank located in the lower part of said chamber, a valved steam-supply pipe leading into said tank, a thermostat extending into said chamber and connected with the valve in said pipe to regulate the supply of steam therethrough, and a vapor condensing chamber-top provided with means for maintaining a circulation of water thereover, means for conveying water from said top into said tank and an overflow outlet connected to said tank.

4. A low temperature cooking apparatus, comprising a cooking chamber or oven having heat-insulated bottom and side walls, a tank forming the top or cover for said chamber, a tank located in the lower part of said chamber, a conduit leading from said cover tank to said lower tank, a water supply for said cover tank, a steam supply pipe leading into said lower tank, means for controlling the supply of steam and an overflow outlet connected to said tank.

5. A low temperature cooking apparatus, comprising a cooking chamber or oven having heat-insulated bottom and side walls, a tank forming the top or cover for said chamber, a tank located in the lower part of said chamber, a conduit leading from said cover tank to said lower tank, a water supply for said cover tank, a steam supply pipe leading into said lower tank, means for controlling the supply of steam, and an overflow outlet controlling the level of the water in the lower tank.

6. A low temperature cooking apparatus, comprising a cooking chamber or oven having heat-insulated bottom and side walls, a tank forming the top or cover for said chamber, a tank located in the lower part of said chamber, a conduit leading from said cover tank to said lower tank, a water supply for said cover tank, a steam supply pipe leading into said lower tank, means for controlling the supply of steam, a trough or gutter extending along one side of the tank at the normal level of the water in the tank and an outlet pipe connected with said trough.

In testimony whereof I affix my signature.

OSCAR M. WOLFF.